July 7, 1970   A. R. McFARLAND ET AL   3,518,815
AEROSOL SAMPLER
Filed May 24, 1968   2 Sheets-Sheet 1

INVENTORS
ANDREW R. McFARLAND,
CARL M. PETERSON
BY
John J. Held Jr.
ATTORNEY

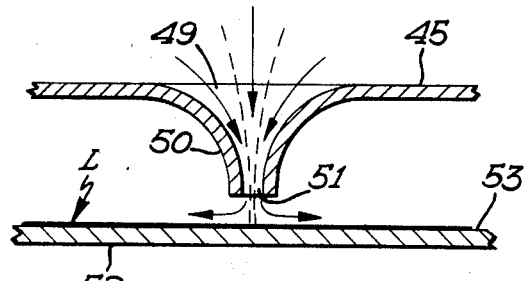
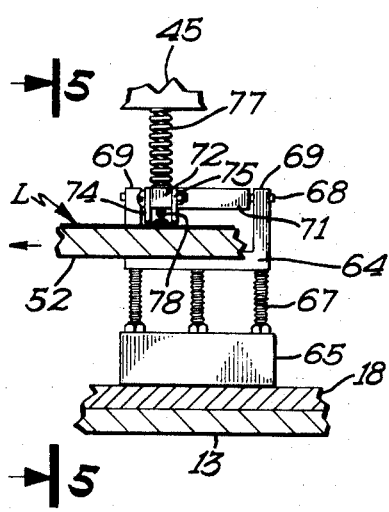
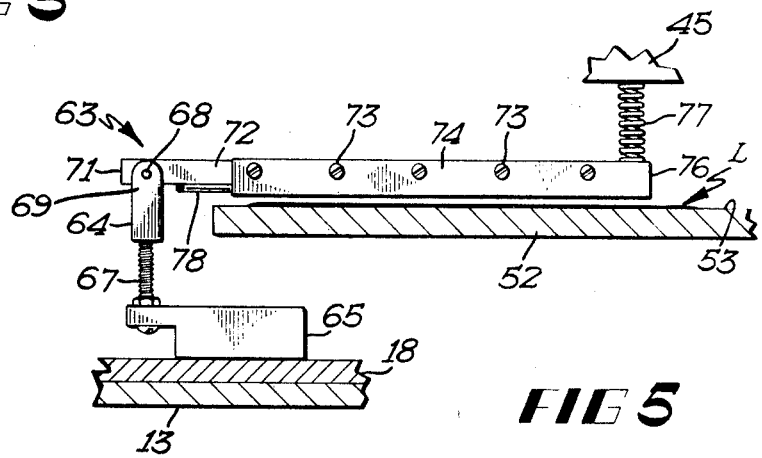
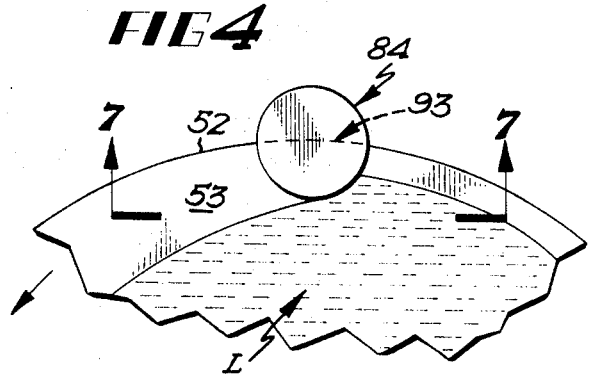
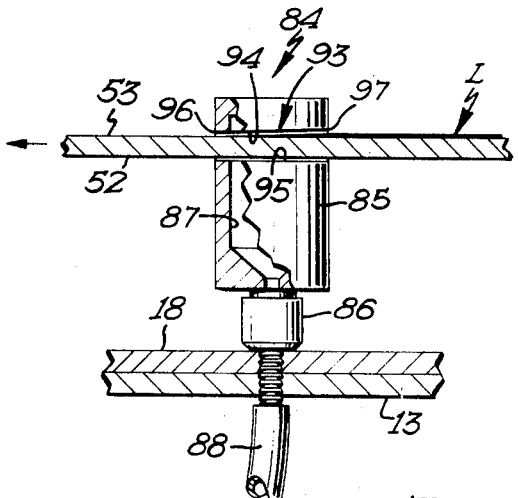

United States Patent Office 3,518,815
Patented July 7, 1970

3,518,815
AEROSOL SAMPLER
Andrew R. McFarland and Carl M. Peterson, Minneapolis, Minn., assignors to Environmental Research Corporation, St. Paul, Minn., a corporation of Minnesota
Filed May 24, 1968, Ser. No. 731,881
Int. Cl. B01d 47/00
U.S. Cl. 55—241
10 Claims

ABSTRACT OF THE DISCLOSURE

The improved inertial impactor, aerosol sampler of the present invention is used to obtain a hydrosol for subsequent analysis from a continuous flow of gas. The improved sampler includes a housing having a gas inlet, a gas outlet and a passageway. A suction blower, positioned adjacent to the gas outlet, causes gas to flow through the passageway. A plurality of nozzles, formed in a plate assembly adjustably positioned in the passageway immediately upstream of a collection disc, are utilized to increase the velocity of the gas stream and to direct the high velocity gas stream at the collection disc. As a result of the arrangement of the nozzle assembly plate and the collection disc, the direction of flow of the high velocity gas stream is abruptly changed adjacent to the disc so as to permit the gas to flow around the periphery of the disc. This abrupt change of direction of the gas stream causes the aerosol, with sufficient inertia, to impinge upon the collection disc and be entrained thereon in a thin, continuous liquid film formed and maintained on the collection disc by a novel liquid feeder. The nozzles are arranged and disposed, relative to the collection disc, so that the high velocity gas streams emitted therefrom do not significantly interrupt the integrity of the liquid film or cause substantial aerosolization of the liquid. The liquid and the hydrosol therein are removed from the disc by a novel aspirator for further analysis.

BACKGROUND OF THE INVENTION

This invention relates to an improved aerosol sampler, and more specifically, to an improved inertial impactor, aerosol sampler which may be utilized to sample continuously relatively large volumes of aerosol.

In the past, aerosol samplers have utilized the "inertia impact" principle to separate aerosol from the gas to be sampled. However, in such samplers, a solid or jell substrate was generally used to collect the separated aerosol particles. One of the disadvantages of the samplers utilizing a solid or jell collection subtrate was that the operation of the sampler had to be periodically discontinued so that the collection substrate and separated aerosol could be removed from the sampler.

Other previous aerosol samplers have used a liquid substrate to collect the separated aerosol particles. These samplers, however, have not utilized the "inertia impact" principle to separate the aerosol from the gas, but have used other means, such as electrostatic deposition, to separate the aerosol. However, such samplers were generally more expensive to manufacture and maintain than the inertial impactor samplers.

The reason for not heretofore using a thin liquid film as a collection subtrate with an inertial impactor sampler was that it was thought that the relatively high velocity gas stream, such as is required for inertial separation of the aerosol, would destroy the integrity of the liquid film and would cause aerosolization of the liquid, thereby producing inefficient and inaccurate results.

SUMMARY OF THE INVENTION

Briefly, the improved aerosol sampler of the present invention combines the inertial impact separation principle with a liquid collection substrate. This combination is achieved by utilizing a novel nozzle assembly plate in which the nozzles are arranged and disposed with respect to the radii of the rotating collection disc so that the high velocity gas streams directed at the disc by the nozzles do not significantly interrupt the integrity of the liquid substrate film and do not cause substantial aerosolization of the liquid. Also, a novel aspirator is used to remove the liquid and hydrosol from the disc as it reaches the periphery of the disc, whereby high collection efficiencies can be achieved.

Accordingly, it is an object of the present invention to provide an improved aerosol sampler in which the aerosol is separated from the gas stream by the principle of inertial impaction and a liquid substrate is utilized to collect the separated aerosol.

Another object of the present invention is to provide an improved inertial impactor aerosol sampler in which a nozzle assembly plate is located immediately upstream of the collection disc and in which the elongated nozzles in the nozzle assembly plate are arranged at an angle with respect to the radii of the collection disc. A related object of the present invention is to provide an improved inertial impactor, aerosol sampler in which the longitudinal central axes of the elongated nozzles are disposed at an angle of approximately 15° to the radii of the collection disc, in which the radial outer end of the elongated nozzles are disposed in the forward direction, with respect to the direction of rotation of the collection disc, and in which the longitudinal central axes of the nozzles are tangent to a circle having a diameter less than the outer diameter of the collection disc.

Still another object of the present invention is to provide an improved inertial impact, aerosol sampler in which a novel liquid feeder forms and maintains a thin, uniform thickness, continuous liquid film on the rotating collection disc and in which the liquid film and hydrosol are removed from the disc by a novel aspirator at a point adjacent to, but spaced radially inwardly from, the periphery of the collection disc.

These and other objects and other features of the present invention will become apparent from the following description of the preferred embodiment of the present invention described in conjunction with the accompanying drawings.

DESCRIPTION OF THE DRAWINGS

FIG. 3 is a vertical, cross-sectional view taken along the lines 3—3 in FIG. 2.

FIG. 4 is an enlarged end view of the novel liquid feeder of the present invention.

FIG. 5 is a vertical, cross sectional view taken along the line 5—5 of FIG. 4.

FIG. 6 is a partial plane view of the collection disc and novel aspirator of the present invention.

FIG. 7 is a partial vertical, cross-sectional view taken along lines 7—7 in FIG. 6.

Figure 1:
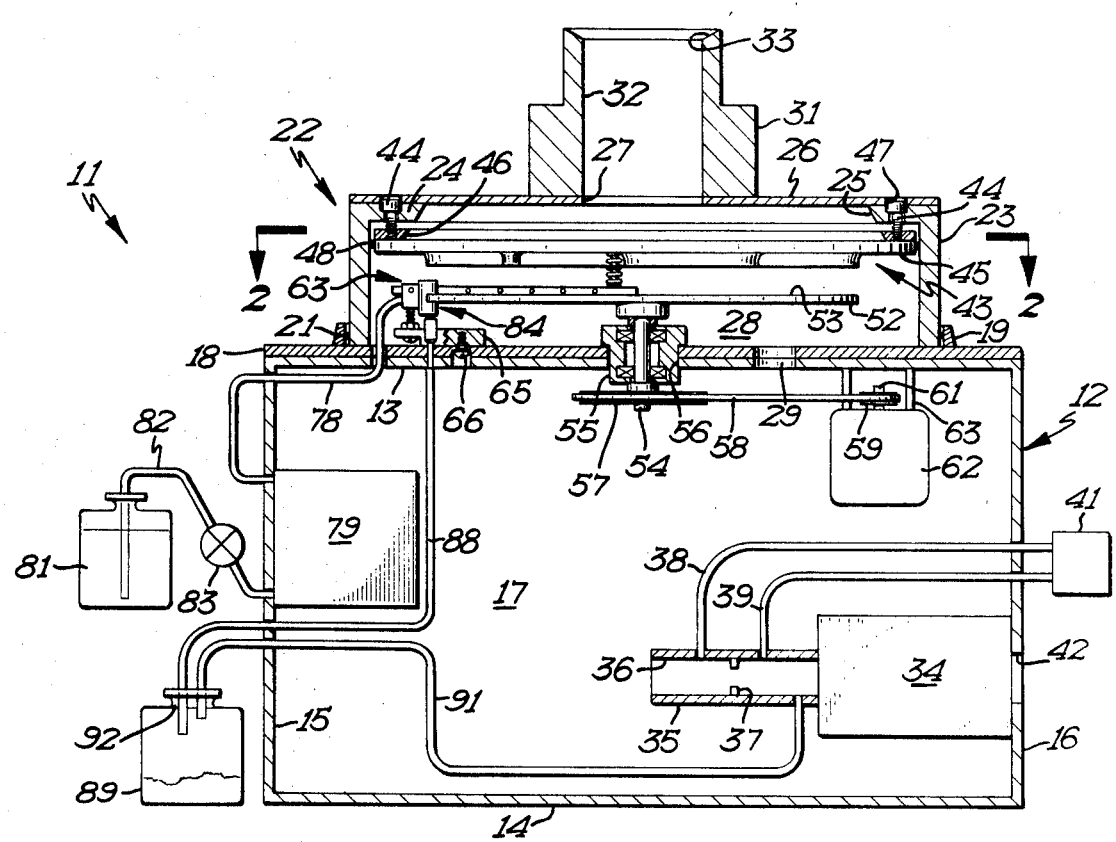
FIG. 1 is a vertical, cross-sectional view of the improved aerosol sampler of the present invention.

Throughout the various figures of the drawings, the same numerals will be used to designate the same parts. Moreover, when the terms "upper," "lower," "top," "bottom," "left," and "right" and the like are used herein it should be understood that these terms have reference to the structure shown in the drawings, as it would appear to a person viewing the drawings, and are used only for convenience of describing the preferred embodiment of the present invention.

DESCRIPTION OF THE PREFERRED EMBODIMENT

Referring now to FIG. 1, the improved aerosol sampler of the present invention is shown generally at 11. The sampler 11 includes a main housing 12 which has top and bottom walls 13 and 14 and side walls 15 and 16 which together define a central, interior chamber 17. A second, reinforcing wall 18 is secured to the upper side of top wall 13 and completely overlies the wall 13. An annular flange 19 is mounted on the upper side of wall 18 and includes a grove formed in its radially inwardly facing surface for carrying a conventional seal 21 which, for example, may be an O-ring seal.

An upper housing 22 is supported on the wall 18 and includes an annular side wall 23. The outer diameter of the side wall 23 is selected so that the housing 22 can be positioned within the flange 19 with a substantially air tight seal being formed by seal 21 between the radially inwardly facing surface of the flange 19 and the radially outward surface of the wall 23. A radially inwardly directed flange 24 is formed on the upper end of the wall 23 with the radially inward end of the flange 24 defining a central opening 25. A circular plate 26 is fastened to the upper side of flange 24, with the plate 26 having the same outer diameter as the wall 23. A central opening 27 is formed in the plate 26 with the opening 27 having a smaller diameter than the opening 25. The wall 18, wall 23 and plate 26 define a central, interior chamber 28 in the housing 22. A plurality of openings, one of which being shown at 29, extend through the walls 13 and 18 so as to permit communication between the chambers 17 and 28.

A stepped, gas inlet tube 31, including a central cylindrical passageway 32 having the same diameter as the opening 27, is mounted on the upper side of plate 26 so that the central axes of the passageway 31 and opening 27 are coaxial. The upper end 33 of the tube 31 is open to the atmosphere, or to any other supply of gas that is to be sampled, so as to permit the gases or air to be drawn into the chamber 28 of the housing 22.

A conventional suction blower 34 is positioned within the chamber 17 and is supported by the side wall 16 of the housing 12. The blower 34 includes an inlet 35 having a cylindrical passageway 36 in which an orifice 37 is positioned. The tubes 38 and 39 communicate at one end with the passageway 36 on the upstream and downstream sides of the orifice 37, respectively. The other ends of the tubes 38 and 39 communicate with a conventional indicator 41 so that the rate of flow of gas through the sampler 11 can be ascertained by the measurement of the pressure drop across the orifice 37. The exhaust from the blower 34 is forced out of the chamber 17 through an opening 42 in the side wall 16. The operation of the blower 34 causes gas, at a relatively high rate of flow, to be drawn into chamber 28 of the sampler 11, through the passage 32. Thereafter, the gas passes from chamber 28, through the opening 29 and into chamber 17. The gas in the chamber 17 is threafter expelled from the chamber 17 to the exterior of the sampler 11 through the opening 42. A typical blower of the type that can be used is the blower Model No. 115407, manufactured by Lam Electric, a division of Ametek, Inc., of Kent, Ohio.

Figure 2:
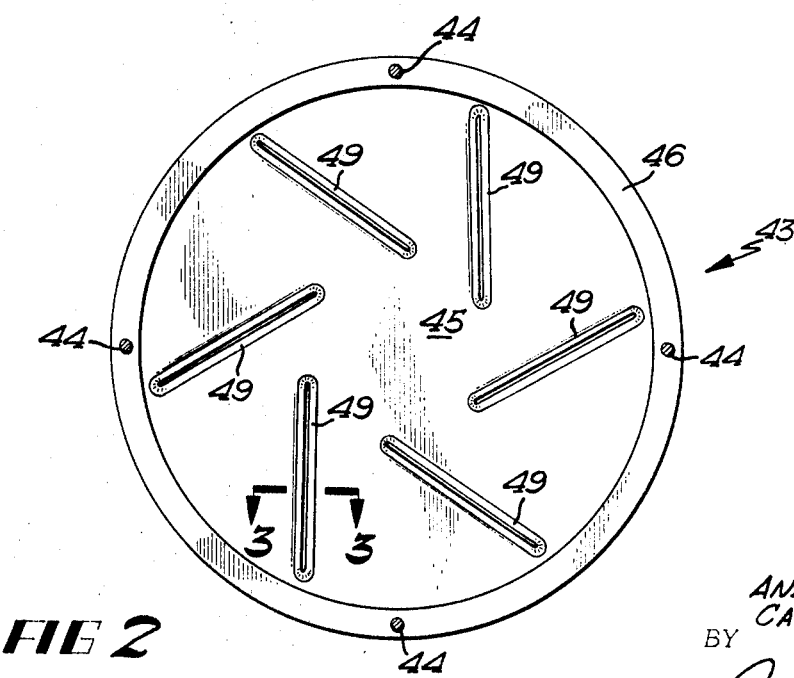
FIG. 2 is a transverse, cross-sectional view taken along lines 2—2 in FIG. 1.

Referring now to FIGS. 1–3, a nozzle plate assembly 43 is mounted in the chamber 28 by a plurality of screws or bolts 44, which depend from the flange 24. The plate assembly 43 includes a circular plate 45 and an integral annular flange 46 formed on the upper peripheral surface of the plate 45. The screws 44 are threadedly received in the flange 46, and the plate 26 has a plurality of apertures 47 formed therein which permit access to the heads of the screws 44 from the exterior of the housing 22. The plate assembly 43 is positioned transversely across the chamber 28. The arrangement of the screws 44 and the assembly 43, permits the vertical position of the plate assembly 43, within the housing 22, to be adjusted for reasons more fully described hereinafter.

A conventional seal 48 which, for example, may be an O-ring seal, is secured to the radially outwardly facing, periperal surface of the plate 45. The outer diameter of the plate 45 is selected so that the seal 48 provides an air tight seal between the plate assembly 43 and the readially inwardly facing surface of the wall 23.

The late 45 includes six elongated nozzle assemblies 49 which are equispaced from each other and from the center of plate 45. As shown in FIG. 2, the central longitudinal axes of the nozzle assemblies are disposed at an angle of approximately 15° to the radii of the plate 45 and the radially outer ends of the nozzle assemblies 49 are all disposed in the same direction, with the central longitudinal axes of the nozzle assemblies being tangent to a circle having a diameter less than the outer diameter of plate 45.

The nozzle assemblies 49 each include a regularly curved, converging nozzle 50 which is positioned below the plane of the plate 45 and which functions to increase the velocity of the gas stream flowing therethrough for the purpose hereinafter described. Moreover, all gas flowing through the sampler 12 must pass through the six nozzle assemblies 49 since the seal 48 prevents the gas from otherwise passing or leaking around the plate assembly 43.

The nozzle assemblies 49 can be formed by a stamping process or the nozzle assembly can be a separate piece(s) which is attached to the under side of the plate 45. However, any other method of manufacture or fabrication could be utilized so long as the nozzles 50 significantly increase the velocity of the gas flowing therethrough.

A circular collection disc 52, and more specifically the upper surface 53 of the disc 52, is positioned immediately below and spaced closely adjacent to the substantially rectangular outlets 51 of the nozzles 50. The disc 52 and the plate 45 are maintained substantially parallel to each other. Also, the spacing between the plate 45, and thus the outlets 51 of the nozzles 50, and the upper surface 53 of the disc 52 can be changed by an adjustment of the screws 44. The outer diameter of the disc 52 is greater than the diameter of a circle which includes the radially outer ends of the nozzle assemblies 49, but less than the outer diameter of the plate 45.

The disc 52 is supported and carried by a spindle 54 which is secured to the center of the disc. The spindle 54 is journaled in a conventional bearing block and bushing 55 that is mounted in an aperture 56 in the walls 13 and 18. A pulley 57 is fastened to the lower end of the shaft 54 so that the pulley and shaft rotate together as a unit. The pulley 57 is connected by means of a conventional drive belt 58 with a pulley 59 fastened to the output shaft 61 of a conventional electric motor 62. The motor 62 is mounted within the chamber 17 by means of a support 63. By means of the pulleys 57 and 59 and belt 58, the motor 62 rotates the disc 52 at a uniform speed during operation of the sampler 11. A typical motor of the type that can be used is motor Model No. HD–1, manufactured by New England Gear Works, of Southington, Conn.

As will be apparent from FIG. 3, the relatively high velocity gas stream passing through the nozzles 50 are directed at the upper surface 53 of the rotating collection disc 52. Since the gas cannot flow through the disc 52, the direction of flow of the gas is abruptly changed and the gas, at a lower velocity, thereafter flows around the periphery of rotating disc 52 and out of the chamber 28 through the openings 29. Because of this abrupt change in direction and because of the high velocity of air stream flowing from the outlets 51 of the nozzles 50, the particles in the gas impinge upon the upper surface 53 of the rotating disc 52. Moreover, as more fully explained below, as a result of a thin, uniform thickness liquid film L which is maintained on the upper surface 53 of the rotating disc 52, the aerosol impinging upon the upper surface 53 is retained on the surface and can be collected for further analysis as more fully described heerinafter. Moreover, as noted above, because of the arrangement and disposition of the nozzle assemblies 49, with respect to the disc 52, the high velocity gas streams do not significantly interrupt or destroy the integrity of the liquid film and do not cause any substantial aerosolization of the liquid.

A liquid feeder 63, best shown in FIGS. 1, 4 and 5, is utilized to form and maintain the necessary thin, continuous, uniform thickness liquid film on the upper surface 53 of the disc 52. The liquid feeder 63 includes a mounting yoke 64 which is supported by the wall 18 and adjacent to the periphery of the disc 52. More specifically, the yoke 64 is mounted on the base 65 that is secured to the wall 18 by a plurality of bolts or screws, one of which being shown at 66. The yoke 64 is supported above the base 65 by three screws 67 which can be rotated so as to adjust the height of the yoke 64 relative to the disc 52. A smaller diameter shaft 68 is journaled in apertures formed in the upper ends of the two yoke arms 69. The base 71 of an arm 72 is supported for limited pivotal movement about shaft 68. The arm 72 extends substantially radially inwardly, with respect to the disc 52, from the yoke 64 and is positioned closely adjacent to the upper surface 53 of the disc 52. A plurality of bolts 73 secure thin plates or blades 74 and 75 to the arm 72 so that the blades 74 and 75 extend from the inner end 76 of the arm 72 back toward the yoke along the portion of the arm which overlies the disc 52. A coil compression spring 77 is positioned between the underside of the plate 45 and the end 76 of the arm so that the arm is stabilized during the operation of the sampler 11.

Referring now to FIGS. 4 and 5, the arm 72 together with the blades 74 and 75 form a generally U-shaped channel. A liquid feed tube 78 is secured to the underside of the arm 72 between the plates 74 and 75 so that the tube is positioned completely within this channel. The liquid feed tube 78 is perforated along that portion of the tube which is positioned within the U-shaped channel of the arm 72 so that liquid flowing through the tube 78 can leak slowly out of the tube and onto the upper surface of the rotating disc when the liquid feeder 63 is in position shown in FIG. 1. The lower edges of the blades 74 and 75 are spaced closely adjacent to, but not in contact with, the upper surface 53 of the disc 52. These blades 74 and 75 act as "doctor" blades in that they cause a thin, uniform thickness, continuous film of liquid to be spread upon the upper surface 53 of the disc 52 as it passes beneath the arm 72.

The tube 78 extends into the chamber 17 through apertures formed in the walls 13 and 18 and then in connected with the discharge of a conventional peristaltic pump 79 which is used to pump the liquid to the feeder 63. A typical pump of the type which may be used is Model No. 2–6100, manufactured by Buechler Instruments, Inc., of Fort Lee, N.J. The inlet of the pump 79 communicates with a container of liquid 81, positioned externally of the housing 12, through a tube 82. A conventional valve, shown schematically at 83, is connected with tube 82 and is utilized to control the flow of liquid through the tube and thus the rate at which liquid is discharged from the feeder 63.

Referring now to FIGS. 6 and 7, an aspirator 84 is mounted adjacent to the periphery of disc 52 and is utilized to remove the liquid or the hydrosol, i.e., the particles entrained in the liquid, together with liquid, on the surfaces of the disc 52. The aspirator 84 includes a generally cylindrical member 85 which has a threaded tubular nipple 86 secured to its lower end. The nipple 86 is used to mount the member 85 on the wall 18. The interior chamber 87 of the member 85 communicates, through the nipple 86, with one end of a tube 88. The other end of the tube 88 communicates with a container 89 positioned external to the housing 12. The container 89 also communicates with the inlet passage 36 downstream of the orifice 38 by means of a tube 91. The tubes 88 and 91 are introduced into the interior of container 89 through a stopper 92 which does not permit gas or air to enter the container except through the tubes.

The member 85 has a groove 93 formed therein and is positioned with respect to the disc 52, so that the peripheral portion of the disc 52 passes through the groove 93, with the upper and lower surfaces of the disc being spaced closely adjacent to the upper and lower edges 94 and 95 of the groove. The lower edge 95 of the groove 93 is formed parallel with the lower surface of the disc 52. However, the upper edge 94 of the groove 93 is formed at an angle so that the forward end 96 of the groove 93, with respect to the direction of rotation of the disc 52, is spaced closer to the upper surface 53 of the disc than the trailing end 97. It should be noted that while edges 94 and 95 of the groove 93 are spaced closely adjacent to the upper and lower surfaces of the disc 52 and function as wipers for the liquid on the upper surface 53, there is no contact between the surfaces of the disc and the edges of the groove 93.

The tube 91 connecting the container 89 with the passage 36 causes a slight vacuum to be pulled in the container 89, and thus in the chamber 87, so that the aspirator 84 sucks or draws the liquid or the hydrosol from the surface 53 of the disc 52 into the chamber 87, whereupon the liquid or the hydrosol flow through the tube 88 into the container 89. Thus, the use of aspirator 84 assures that liquid flowing radially outwardly on the upper surface 53 of the disc 52 is removed from the surface 53 as it reaches the periphery of the disc 52.

Briefly, the operation of the sampler 11 is as follows: When the blower 34 is in operation, the gas is drawn into the sampler 11 through the inlet passageway 32 and into the chamber 28. The gas in the chamber 28 is drawn through the nozzles 50 in the plate 45 and the velocity of the gas stream is increased as it passes through the nozzles 50 so that the gas stream emitted from the nozzle outlets 51 has a relatively high velocity. While the gas streams emitted from the nozzles 50 are directed at the upper surface 53 of the collection disc 52, the path of these gas streams is abruptly changed so as to permit the gas to flow parallel with the upper surface 53 of the disc. This abrupt change of direction of the gas stream causes particles, with sufficient inertia, to impinge on the surface 53 of the disc 52 and to be entrained by the thin, continuous liquid film maintained on the surface 53 by the liquid feeder 63.

As noted above, the arrangement of the nozzles 50 is such that the high velocity gas streams emitted from the nozzle outlets 51 do not interrupt or destroy the integrity of the liquid film and do not cause aerosolization of the film. After the gas has passed around the periphery of disc 52, it passes from chamber 28 into the chamber 17 through a plurality of openings 29. The gas in chamber 17 is drawn into the inlet passage 36 by the blower 34, and thereafter the blower 34, in turn, expels the gas out of the housing 12 through the opening 42 in the side wall 16 of the housing 12.

The liquid film deposited on the disc by the liquid feeder 63 flows radially outwardly as the disc 52 rotates until the outer peripheral portion of this liquid film is removed from the rotating disc by the aspirator 84. The advantage of using the aspirator described herein is that none of the liquid or hydrosol is spilled or sprayed within the housing 22 and all the hydrosol is collected.

The liquid or hydrosol removed from the surface 53 of the disc 52 by the aspirator 84, flows to the container 89 through the tube 88. After the container 89 has been filled with a sufficient quantity of hydrosol, the container may be removed and the hydrosol analyzed.

A sampler, similar in construction and design to the sampler 11 described hereinabove, has been constructed and satisfactorily tested. In this sampler, the following design parameters were utilized. The nozzle outlet has a width of 0.0300 inch and a slit length, along the central longitudinal axis, of 2.5 inches. The aerosol sampling rate was a thousand (1,000) liters per minute with the velocity of the gas stream in the nozzles being approximately 186 feet per second resulting from a suction of 13 inches of water applied to the housing by the blower. The disc, corresponding to the disc 52, and a diameter of 7.125 inches and the disc was rotated at a speed of 200 r.p.m. The central longitudinal axis of the nozzles were tangent to a circle having a diameter of 1.75 inches. Liquid was deposited on the upper surface of the rotating disc at a flow rate of 4 milliliters per minute.

This sampler, when tested with an aerosol composed of nebulized *Bacillus subtilis* bacteria, yielded an efficiency of seventy-five percent (75%). When the same sampler was tested with one micron diameter dye particles, its collection efficiency was ninety-five percent (95%).

In view of the foregoing, it is apparent that the improved sampler of the present invention provides an apparatus for continuously sampling high volumes of gas. Moreover, due to the specific arrangement of an inertia separator and a rotating collection disc having a thin, continuous, liquid film maintained thereon, this improved sampler provides more efficient sampling, relative to the present commercially available aerosol samplers.

It should be noted that various modifications could be made in the specific structure described above. For example, the number, arrangement and disposition of nozzles utilized may be varied as well as the specific structure of the liquid feeder and the aspirator. Likewise, different pumps or blowers could be utilized and positioned at different points within the sampler. However, the above described arrangement has been found to function satisfactorily.

Therefore, it is clear that this invention may be embodied in other specific forms without departing from the spirit or central characteristics thereof. The present embodiment is thus to be considered in all respects as illustrative and not restrictive, the scope of the invention being dictated by the appended claims, rather than by the foregoing descripion, and all changes which come within the meaning and range of equivalency of the claims are therefore intended to be embraced therein.

We claim:

1. An improved inertial impactor, aerosol sampling apparatus for producing a hydrosol for subsequent analysis from a continuous gas stream, the improved apparatus comprising: a housing having a gas inlet, a gas outlet and a gas flow passage therethrough connecting said gas inlet with said gas outlet; means for causing a continuous stream of gas to flow through said gas flow passage; a collection disc positioned transversely across said gas flow passage and spaced from the wall thereof so that said gas stream is directed at one surface of the collection disc and then must pass around the periphery of the collection disc; means for rotating the collection disc; liquid feed means for introducing liquid onto said one surface of the collection disc, including control means for regulating the flow of liquid from the liquid feed means onto said one surface of the collection disc, the liquid feed means being positioned over the collection disc and the rotational speed of the collection disc being selected so that a continuous, a substantially uniform thickness liquid film is formed and maintained on said one surface of the collection disc; means for removing said liquid from said one surface adjacent to the periphery of the collection disc and from the housing; and means for increasing the velocity of said gas stream immediately upstream of said one surface of the collection disc and for directing said relatively high velocity gas stream at said one surface of the collection disc so that gas stream does not substantially effect the integrity of said liquid film and does not cause substantial aerosolization of said liquid film, while permitting the aerosol in the gas stream to be impinged upon said one surface of the collection disc as a result of the inertia of the aerosol and to be entrapped, as a hydrosol, in said liquid film, said means for increasing the velocity of said gas comprising a plate positioned in and completely across said flow passage upstream from said one surface of the collection disc, the plate being positioned above the collection disc and including a plurality of nozzles spaced throughout the disc, each nozzle being of relatively small area, with the outlets of the nozzles being spaced immediately adjacent said one surface of the collection disc.

2. The improved apparatus described in claim 1 wherein said plate being substantially parallel to the collection disc and including a plurality of elongated nozzles therein, with the outlet of the nozzles being spaced immediately adjacent said one surface of the collection disc and with the longitudinal central axes of the nozzles being disposed at an angle to the radii of the plate, and thus to the radii of the collection disc so that said axes are all tangent to a common circle having a diameter less than the diameter of the plate.

3. The improved apparatus described in claim 1 wherein the liquid feed means includes: a support mounted adjacent to the periphery of the collection disc; an arm portion extending inwardly from the support over said one surface of the collection disc, the arm portion including an inverted, generally U-shaped channel with the lower edges of the side portions of the channel being spaced closely adjacent to said one surface of the collection disc so that said edges tend to distribute said liquid in a thin film over said one surface of the collection disc; and a tube having one end positioned within said channel, said one end of the tube being perforated and the other end of the tube being connected with a source of liquid under pressure.

4. The improved apparatus described in claim 1 wherein the means for removing said liquid from said one surface of the collection disc includes an aspirator which removes said liquid from said one surface as it reaches the periphery of the collection disc.

5. The improved apparatus described in claim 1 said plate being substantially parallel to the collection disc and including a plurality of equi-spaced elongated nozzles with the outlet of the elongated nozzles being spaced closely adjacent said one surface of the collection disc, with the longitudinal central axes of the elongated nozzles being disposed at an angle to the radii of the plate, and thus to the radii of the collection disc, and with the ends of the elongated nozzle adjacent to the periphery of the plate being disposed forwardly with respect to the direction of the rotation of the collection disc; wherein the liquid feed means includes: a support mounted adjacent to the periphery of the collection disc; and arm portion extending inwardly substantially radially with respect to the collection disc from the support over said one surface of the collection disc, the arm portion including an inverted generally U-shaped channel, the lower edges of the side portions of the channel being closely adjacent to said one surface of the collection disc; and a tube having one end positioned within said channel, said one end being perforated and the other end of the tube being connected with a source of liquid under pressure; and wherein the means for removing said liquid from said one surface of the collection disc includes an aspirator which removed said liquid from said one surface as it reaches the periphery of the collection disc.

6. The improved apparatus described in claim 2 wherein the elongated nozzles are equispaced about the plate and wherein each of the elongated nozzles are arranged so that the ends of the elongated nozzles adjacent to the periphery of the plate are disposed forwardly with respect to the direction of rotation of the collection disc.

7. The improved apparatus described in claim 3 wherein the arm portion extends substantially radially inwardly with respect to the collection disc.

8. The improved apparatus described in claim 4 wherein the aspirator includes a cylindrical member positioned adjacent to the periphery of the collection disc; the cylindrical member having a groove formed therein in which the peripheral portion of the collection disc passes with the edges of the groove being spaced closely adjacent to said one and said other surface of the collection disc and with the edge of the groove adjacent said one surface benig cut at an angle so that the forward end of the edge, with respect to the direction of rotation of the collection disc, is spaced closer to said one surface than the rearward end of the edge.

9. The improved apparatus described in claim 5 wherein each elongated nozzle is constructed so as to have a longitudinal central axis and is positioned relative to the plate so that the angle between the central longitudinal axes of each elongated nozzle and a radius of the plate is approximately 15°; wherein said central longitudinal axes of the elongated nozzles are all tangent to a common circle having a diameter less than the diameter of the plate; and wherein the aspirator includes a cylindrical member positioned adjacent to the periphery of the collection disc, the cylindrical member having a groove in which the peripheral portion of the collection disc passes with the edges of the groove being spaced closely adjacent to said one and said other surface of the collection disc and with the edge of the groove adjacent said one surface being cut at an angle so that the forward end of the edge, with respect to the direction of rotation of the collection disc, is spaced closer to said one surface than the rearward end of the edge.

10. The improved apparatus described in claim 6 wherein each elongated nozzle is constructed so as to have a longitudinal central axis and is positioned relative to the plate so that the angle between the longitudinal central axis of each elongated nozzle and a radius of the plate is approximately 15°.

References Cited

UNITED STATES PATENTS

| 2,394,357 | 2/1946  | Beese          | 55—17  |
| 3,060,595 | 10/1962 | Dapses         | 55—468 |
| 3,229,505 | 1/1966  | Sanford et al. |        |
| 3,401,503 | 9/1968  | Bergstrom      | 261—84 |

FOREIGN PATENTS

| 782,565 | 9/1957 | Great Britain. |

HARRY B. THORNTON, Primary Examiner

B. NOZICK, Assistant Examiner

U.S. Cl. X.R.

55—270, 274, 439, 465, 468; 73—421.5